US006983200B2

(12) United States Patent
Bodin et al.

(10) Patent No.: US 6,983,200 B2
(45) Date of Patent: *Jan. 3, 2006

(54) SUPPLEMENTAL DIAGNOSTIC AND SERVICE RESOURCE PLANNING FOR MOBILE SYSTEMS

(75) Inventors: William Kress Bodin, Austin, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/980,728

(22) Filed: Nov. 3, 2004

(65) Prior Publication Data

US 2005/0096811 A1    May 5, 2005

Related U.S. Application Data

(63) Continuation of application No. 10/290,399, filed on Nov. 7, 2002, now Pat. No. 6,847,872.

(51) Int. Cl.
G06F 19/00 (2006.01)
G06F 17/00 (2006.01)

(52) U.S. Cl. .......................... 701/33; 701/30; 701/31; 701/32; 701/36; 701/29; 701/114; 702/182; 702/183; 340/438; 340/439; 700/213; 714/25; 714/36; 714/728; 705/5; 705/21

(58) Field of Classification Search ............ 701/30–33, 701/36, 29, 114; 702/182–183; 340/438–439; 705/5, 21; 714/25, 36, 728; 700/213
See application file for complete search history.

(56) References Cited

U.S. PATENT DOCUMENTS

| 5,831,992 | A  | * | 11/1998 | Wu ............................ 714/732 |
| 6,691,253 | B1 | * | 2/2004  | Gillenwater et al. .......... 714/36 |
| 6,847,872 | B2 | * | 1/2005  | Bodin et al. .................. 701/33 |
| 2004/0064268 | A1 | * | 4/2004 | Gillenwater et al. .......... 702/40 |

OTHER PUBLICATIONS

Beniaminy et al., Delivering diagnostic solutions with cost expert systems; A case study, 1999, IEEE, p. 367-371.*

* cited by examiner

Primary Examiner—Thomas G. Black
Assistant Examiner—McDieunel Marc
(74) Attorney, Agent, or Firm—Robert H. Frantz; Mark S. Walker

(57) ABSTRACT

Diagnostic codes from a vehicle or other system in transit are transmitted to an opportunity server, which forwards the codes to a supplemental diagnostic service provider. The diagnostic service provider determines if supplemental diagnostics software functions are available, and if so, downloads them to the vehicle. After executing the supplemental diagnostics, the vehicle reports updated codes to the opportunity server. Multiple cycles of selection, downloading and execution of supplemental diagnostics may be performed until fault isolation is achieved, following which the opportunity server issues requests for bids to potential repair service provides. Responding offers are received, coalesced and presented to the operator. The operator of the vehicle is presented with one or more coalesced offers, upon selection of which, a service is scheduled.

18 Claims, 4 Drawing Sheets

SUPPLEMENTAL DIAGNOSTIC AND SERVICE RESOURCE PLANNING FOR MOBILE SYSTEMS

CROSS-REFERENCE TO RELATED APPLICATIONS

(CLAIMING BENEFIT UNDER 35 U.S.C. 120)

This application is a continuation of U.S. patent application Ser. No. 10/290,399, filed on Nov. 7, 2002, now U.S. Pat. No. 6,847,872, and is related to U.S. patent application Ser. No. 10/232,246, filed on Aug. 29, 2002, both filed by William Kress Bodin, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This invention relates to the technologies of automated and preemptive service determination, brokering and scheduling for moving systems such as automobiles, trains, trucks, ships, and aircraft. The invention relates more particularly to systems for remotely providing enhanced and supplemental diagnostics, and subsequently performing enhanced materials and resource planning based upon such results.

2. Background of the Invention

Vehicles are traditionally designed and built with a finite set of gauges or indicator warning lights which are intended to convey vital operational status to the operator of the vehicle. For example, many automobiles are equipped with a temperature gauge or warning light, and an oil pressure gauge or warning light, on the dashboard. If a temperature gauge enters a range indicating higher than normal operating coolant temperature, the driver may choose to continue driving until a service station is reached. For indicator lights, often referred to as "dummy lights", the light may be illuminated when the temperature has reached a critical point, leaving the driver with even fewer options (e.g. less time to find a service station). Most automobiles, however, are equipped many sensors in the engine, electrical, electronic, and drive train subsystems, which provide more information regarding the status of the engine. This detailed information, however, is not usually presented to the driver, but is maintained in memory by an on-board computer for later analysis by an automotive technician and/or diagnostic computer. During the operation of the vehicle, the on-board computer may simply determine if a sensor indicates a potential problem and decide to illuminate a warning light.

Most modern vehicles, including ships, aircraft, trains, trucks and cars, follow this convention of collecting a large amount of sensor and indicator data from the vehicle's subsystems, storing these data items in memory, and presenting simple, "high level" indicators to the vehicle operator (e.g. pilot, captain, etc.).

So, for example, when a driver sees an over-temperature indicator light or notices a temperature gauge in the "hot" range, he must make a fairly uninformed decision as to how to proceed. If he is driving on a highway, he must decide to "chance it" and continue driving until the next town or service center is reached in the hopes that an appropriately-equipped and staffed repair shop will be found. By doing so, he risks causing expensive damage to the vehicle's engine. If he chooses to take such a risk and upon arrival at the next town finds that no appropriately equipped or staffed shop is available, he may have to pay for a tow anyway, thereby finding that he incurred the risk of engine damage unnecessarily (e.g. he could have stopped on the roadside and called for a tow).

This particular problem has become even more pronounced as the automobile industry has diversified in recent years. Many consumers are purchasing vehicles which are made by manufacturers who have small portions of market share in the country where they reside, and thus there are fewer repair centers which are equipped with the diagnostic equipment for his or her particular make-and-model of vehicle and who have appropriately trained staff for the needed repair. In one example, a driver may have a car which cannot be serviced by any shop in the next town because it is manufactured by a company which does not have a dealer in town. In another example situation, a dealer for the driver's car may be in town, but the malfunction may be in a subsystem for which the dealer does not have a trained technician currently on staff or on call (e.g. a problem within the transmission but the dealer has no transmission technicians on staff). A third aspect of whether or not service can be obtained as needed is whether or not a service center has ready access to spare parts and replacement components, as may be required.

All travel is time dependent (e.g. there is an itinerary to be kept), whether it is a road trip in a car by a private consumer, a transoceanic shipment by ship or a scheduled airline flight, and as such, all of these factors must be met in a timely fashion to minimize the economic, social, and financial impact of a vehicle repair:

(a) availability of an appropriate business entity to provide the service (e.g. car repair shop, aircraft maintenance depot, etc.);
 (b) availability of appropriately skilled service personnel;
 (c) availability necessary facilities, tools and systems (e.g. diagnostic systems, repair tools, etc.); and
 (d) availability of components and repair parts.

In most cases, another factor of obtaining service is whether or not the price or cost of the service is acceptable to the operator of the vehicle. In some cases, such as having a car indicator illuminate while on a cross-country trip or visiting a city away from home, the driver may anticipate being charged an exorbitant amount for a routine repair, and as such, may decide not to seek service until returning to his or her home town, further increasing his or her risk for greater vehicle damage and possibly causing safety problems.

As a result, while ample diagnostic information to determine a needed service and replacement component is often collected by vehicle on-board computers and sensors, and while some operational time before arriving at a point of possible service is often available (e.g. driving time to next town, flight time to land at next airport, travel time to next train depot, etc.), this time is not wisely used to search for appropriate service providers and to negotiate for acceptable service cost. Normally, the operator of the vehicle will begin these processes after arriving at the next point of service, which may incur additional costs (e.g. overnight shipping of parts, hotel stays, rental vehicles, etc.) and may cause undesirable delays to the itinerary.

Many vehicle operators and vehicles are equipped with communications systems (e.g. radio, wireless telephones, etc.) which allow them to communicate to some degree their problem while in transit, and to attempt to set arrangements for service at the next point of service. However, this can be ineffective as it can be very difficult, for example, for a car driver to obtain quotes for parts and service while driving on a highway, especially because he or she is not privy to the detailed error codes stored in the on-board computer's memory thereby making an accurate diagnosis difficult.

Still other systems, such as General Motor's On Star [TM] system, provides for triggering of communications such as a cell telephone to call to an operator when certain conditions are detected, such as deployment of an airbag. Generally, this only helps the driver get in contact with possible assistance, but does not relieve the driver of the mental distraction trying to describe a problem and to negotiate for a service action. Another potentially useful service are cellular-based concierge services, which allows a driver to call a single point of contact to initiate assistance such as scheduling a car maintenance appointment. These services, however, are more general purpose in nature (e.g. making hotel reservations, obtaining show tickets, etc.), and are of limited assistance with handling detailed vehicle trouble and maintenance discussions. In either of these cases, the on-board diagnostic information is neither available to the driver, the assisting telephone operator or concierge for accurate and precise planning of a maintenance service.

Therefore, there is a need in the art for a system and method which utilizes the time available between the first time of detection of a potential problem on a mobile system or vehicle in transit and the time to arrival at a point of service to determine potential providers, obtain quotes from the service providers, select a provider and schedule the service action such that itinerary impact is minimized, safety and convenience to the vehicle operator is maximized, and exorbitant unexpected expenses are eliminated. The system and method disclosed in the related patent application addresses these need to a great degree.

However, most vehicles are provided with a finite set of diagnostic capabilities, based in part on the "hardware" installed on the vehicle such as the sensors and indicators available to the many subsystems, and based in part on the diagnostic firmware or software programmed into the vehicle's control computer and/or subsystems. As a result, to the extent that accurate and complete diagnosis of a vehicle problem can be made with the "resident" hardware and firmware, the system and method of the related patent application may accurately provide for anticipatory brokering and scheduling of service actions, including procurement of appropriate spare parts and scheduling of appropriately skilled service personnel.

In some cases, however, the resident diagnostic capabilities may not be sufficient to accurately or fully diagnose a vehicle failure. In such a case, a vehicle may arrive at the selected service center, and may be connected to a more powerful diagnostic testing system. At this point, the failure may be more accurately pinpointed, but in some cases, the needed part may not be in stock, or an appropriately skilled repair technician may not be on call. For example, assume that a vehicle is traveling on a highway when it experiences a failure in the fuel system. The on-board diagnostics may determine that it is likely a fuel pump problem, so the system and method of the related application would find an acceptable shop with the part and technician on hand at the estimated time of arrival, perhaps two hours in advance. Then, upon arrival at the selected repair shop, it is determined that the fuel pump on the vehicle is in fine working order, and that the problem is actually in a wiring harness which interconnects the vehicle's control computer to the fuel system sensors, thereby giving a false indication of a failed fuel pump. If the wiring harness is not currently in stock at this shop, or the technician who is qualified to make electrical and electronic repairs to the vehicle is not on duty, the vehicle operator may be faced with a tough decision to proceed traveling without a working fuel system diagnostic capability, or to wait for a technician and/or part to be procured. This may also leave the operator at a disadvantage for securing the best possible price for the service, as his or her car is now "in the shop" and may not be easily moved to another shop. Additionally, the two hours of travel time which has elapsed since the first detection of the failure has not been effectively utilized to secure prompt and cost-effective service for the vehicle.

In such a case, the vehicle operator is relegated to the situation and disadvantages as previously described, despite the existence and use of the system and method of the related patent application. Therefore, there is a need in the art for a system and method which, upon detection of an initial vehicle failure, provides enhanced diagnostic accuracy for the vehicle in transit, and further provides for enhanced anticipatory brokering and resource planning, in order to maximize the likelihood that a needed service will be obtained with minimal perturbation from the vehicle operator's itinerary, and with maximize value.

BRIEF DESCRIPTION OF THE DRAWINGS

The following detailed description when taken in conjunction with the figures presented herein provide a complete disclosure of the invention.

SUMMARY OF THE INVENTION

The invention integrates the on-board diagnostics capabilities of mobile systems such as vehicles, location based services technologies, and networked supply chain management technologies to provide anticipatory arrangement of required services and maintenance actions. Based upon real-time fault condition detection in a mobile system and upon the system's location and direction of travel, one or more potential geographic points of service, preferably within the scheduled itinerary of travel, is determined.

The fault or trouble indicators are then analyzed to determine if more extensive diagnostic software functions are available for the vehicle, and if so, these diagnostic modules are downloaded to the vehicle and executed. The enhanced results are then received by a server, where the fault or trouble indicators are then analyzed to determine minimum service provider characteristics (e.g. hours of operation, staff qualifications, equipment and parts on-hand, etc.), and quotes or estimates for expected service actions are solicited and collected from partner provider systems.

These quotes are analyzed and presented to the mobile system operator for selection, either manually or automatically, based upon user preferences. If a service provider is selected, the service is scheduled according to an estimated time of arrival of the mobile system, including arranging for parts to be procured in advance such that there is minimal delay to the travel itinerary for the completion of the service.

If no service provider is found or selected, a second wider search for potential providers may be made to minimize deviation from the itinerary, including solicitation of quotes and estimates, selection and scheduling of the service actions.

DETAILED DESCRIPTION OF THE INVENTION

Figure 1:
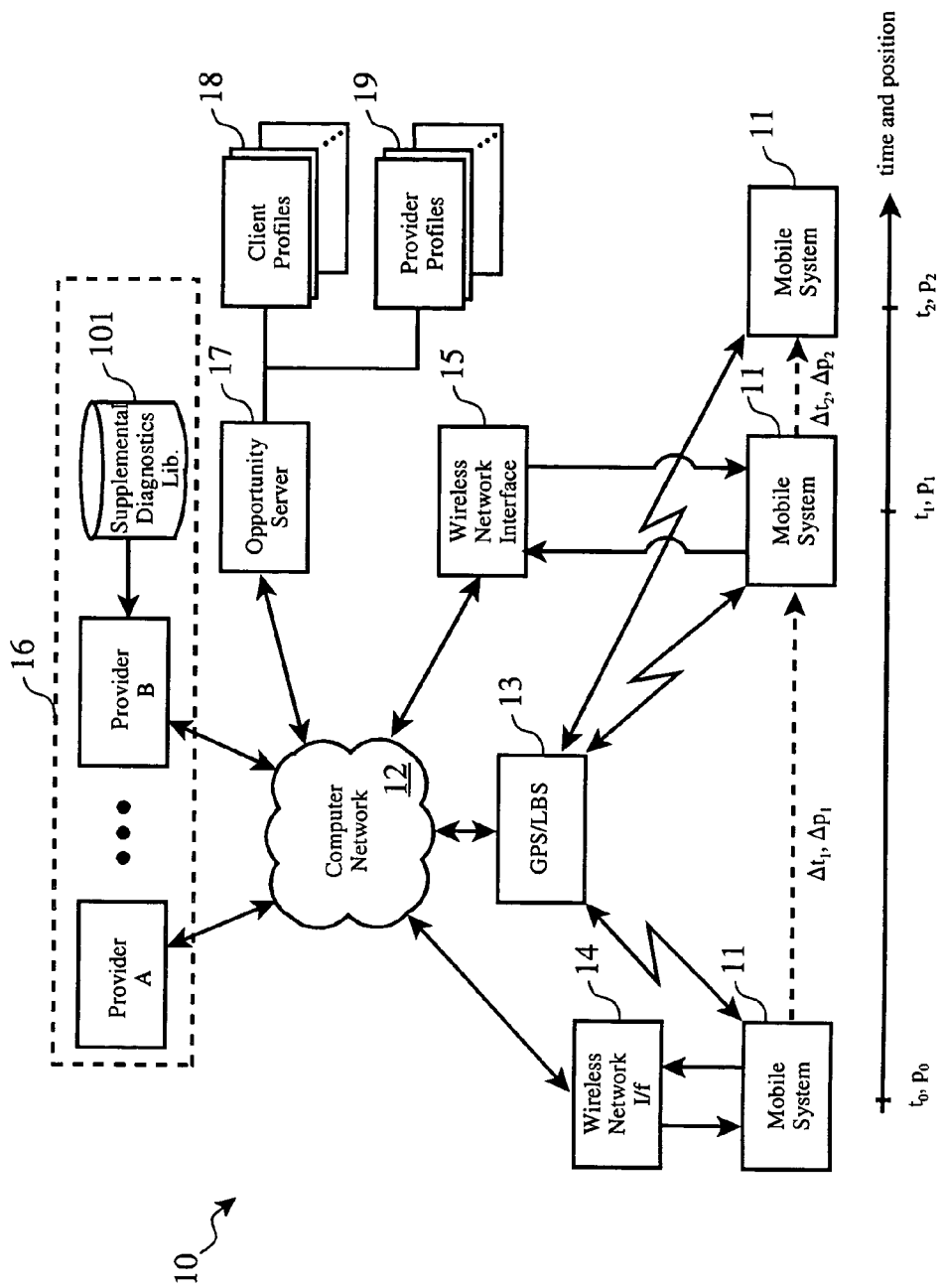
FIG. 1 shows the high level organization of the system according to the invention.

The system and method integrate several well-known technologies via an application server and one or more computer networks, as shown in FIG. 1. The following technologies and terminologies are used within this disclosure.

Location Based Services ("LBS")—a set of services which are associated with and driven by the location of a device such as a wireless telephone, personal digital assistant, or other computer. LBS may use one of several available technologies to determine the geographic location of a device, including but not limited to GPS, the Federal Communication Commission's Enhanced 911 ("E911") or micro-networks such as open-standard BlueTooth.

Global Positioning System ("GPS")—any one of several available technologies for determining geographic position electronically, including most prevalently use of a network of satellites in geosynchronous orbit and a receiver to pinpoint the receiver's location. Older systems, such as LORAN and TRANSIT, may be used, as well. Regional positioning may be determined using signal triangulation or other methods commonly employed to determine in which cell in a cellular system a transceiver is located.

Computer network—most preferably the Internet, but also possibly local area networks ("LAN"), wireless area networks ("WAN"), private networks and intranets.

Wireless network—any suitable communications network for data transmission and reception including Personal Communications Systems ("PCS"), wireless LAN, light wave (e.g. infrared) networks, and radio-based data links, all of which may be of proprietary nature or may conform to one of many well-known wireless standards.

Mobile System—used generally to refer to any system which is able to diagnose its own faults and failures and which may be transported, and especially, but not limited to, the control and diagnostic computers for vehicles such as automotive Electronic Control Modules ("ECM"). A mobile system, however, does not have to be part of a vehicle, but may be vehicle-born, such as certain electronic systems carried in aircraft and ships which may need maintenance actions.

Enterprise Resource Planning ("ERP")—broadly, a set of activities and technologies employed by businesses to effectively plan and use their resources, including materials ordering, order receipt and fulfillment, billing and accounts payable, personnel scheduling and the like.

Supply Chain Management ("SCM")—a group of technologies and methods for coordinating the activities of multiple suppliers to achieve a goal such as delivering a service with certain materials. SCM includes the computer systems used to receive orders and requests for quotes, systems for determining current and future inventories, methods for calculating labor times and values, automated quote generation systems, and systems for executing orders and deliveries of materials.

Mobile System Diagnostic System—any system used to diagnose a mobile system such as a vehicle or other system which can be transported. We will use terms conventional to the automotive industry for this disclosure to broadly encompass similar terms from other mobile systems industries such as aviation, rail and maritime shipping. For example, we will refer to records regarding detected failures and potentially diagnosed root causes as Diagnostic Trouble Codes ("DTC"), and the computer which performs the monitoring of sensors, recording of failures and conditions, and transmission of DTC records as an electronic control module ("ECM"). It will be evident to those skilled in the art that the invention is not related to an automotive implementation, and that the use of these terms from automotive parlance is for understandability and presentation of a preferred embodiment only.

Turning now to FIG. 1, the general system organization (10) of the invention is shown. A mobile system, such as a car ECM, initially is a location or position $p_0$ at an initial time $t_0$ when an initial fault, failure or out-of-range condition is detected within a monitored system. Using a GPS or LBS subsystem such as a GPS receiver, the initial position $p_0$ is recorded with the DTC regarding the detected conditions, as well as with any DTC's which are the result of diagnostic analysis to determine the root cause of the detected condition.

For example, if a low fuel pressure level is detected, the ECM may record the position of the vehicle at the time the condition is detected in a first DTC, and may check other sensors for indications to assist in diagnosing the root cause of the failure. It may be diagnosed that the fuel filler cap may need to be checked or replaced. This diagnosis may be recorded in a second DTC, in typical ECM systems. According to the preferred embodiment, DTC's are recorded in a format commonly understood by automotive diagnostic computers, such as the International Standards Organization's Controller-Area Network ("CAN") or Society of Automotive Engineers' J1850 format. Any format which records this information, however, may be equally well employed to realize the invention, especially for non-automotive applications as previously discussed.

These DTC's are then transmitted to an opportunity server (17), via a first wireless network, and secondly by a computer network (12). According to the preferred embodiment, the wireless network interface is an IBM eNetworks Wireless Switch coupled with convention wireless data communications facilities such as a Personal Communications System ("PCS") transceiver. Other wireless network solutions, such as Motorola's Ricochet network, may be employed as well. The computer network is preferrably the well-known Internet, but may be a proprietary or private network (e.g. LAN, WAN, etc.).

According to the present invention, the opportunity server (17) may then pass the DTC's on to a supplemental diagnostic provider server (16), such as Provider B, who offers downloadable supplemental diagnostics for this vehicle. In a business sense, this service provider may be the vehicle manufacturer itself, an authorized service shop, or a competitive service provider who is not associated with the vehicle manufacturer. In one variation of embodiment of the invention, bids from multiple potential suppliers for supplemental diagnostics services may be tendered and selected as described in the related patent application.

The supplemental diagnostics provider maintains a library (101) of available, downloadable diagnostic functions. So, for our current example, a provider may have a library with two or three additional diagnostic software modules which analyze the fuel system performance to further diagnose the problem and to isolate the failure. In this example, during the remaining transit of the vehicle from the initial position $p_0$ to $p_1$ during a time interval $\Delta t_1$, a supplemental diagnostic function may monitor engine performance (e.g. does it seem to be missing or getting intermittent fuel supply), as well as the pressure indicator sensor status. If the pressure indicator status changes from OK to failed and back to OK several times while the engine performance seems to be fine, a diagnosis of a failed sensor or sensor wiring lead may be made. The supplemental diagnostic function may also be aware of other sensors which are routed with or bundled with the fuel pressure sensor, and may consider their status and performance to determine if it is more likely a wiring harness problem than a sensor problem.

While the number of combinations of possible failures is large, it is feasible to be stored in a server's memory (e.g. a database or large online storage system), while it is not feasible for the control computer of the vehicle to always have these diagnostic functions resident in memory.

So, the supplemental diagnostic provider's server may then transmit or download to the mobile system (11) one or more supplemental diagnostic functions selected from the library (101) based upon analysis of the initial DTC. The mobile system may then execute the supplemental diagnostic functions, and report updated or expanded DTC's to the opportunity server or directly back to the provider server.

Subsequent to receiving additional or more accurate DTC's, the provider server may download additional diagnostic functions (if available). Or, if it is determined that another service provided may have more appropriate supplemental diagnostics functions, that provider may be allowed to download and execute diagnostics functions.

Eventually, after available and necessary supplemental diagnostics have been performed, the most accurate DTCs are received by the opportunity server, wherein the process proceeds similarly to that of the related patent application to broker and schedule the needed service.

The opportunity server receives the DTC's, which result from the supplemental diagnostic services, consults a set of user profiles to determine any user preferences (19) known for the driver (e.g. preference to take his or her car to dealers only), and then determines if there are any potential providers in the future vicinity of the mobile system (e.g. next or previous town on the travel route). Those potential providers (16) are then issued a bid request using ERP and/or electronic data interchange ("EDI") types of communications. To respond to the request for bid, each provider preferably certifies that they have (or will have) stock of necessary components, qualified staff on hand, and the necessary equipment to complete the maintenance action at the time of estimated arrival of the mobile system. Providers may be eliminated or sorted according to the user preferences, such as manufacturer dealers, automobile association ratings, etc.

One or more providers (16), then, may respond with quotes and estimates, which are then coalesced by the opportunity server (15) for downloading and presenting to the mobile system operator (e.g. car driver) via the computer network (12) and wireless interface (14). Presentation of the operator's options may be made graphically using a display on the vehicle's control panel (e.g. a TFT or LCD display on a car dashboard, computer display on a ship's helm, etc.), or audibly via a speakerphone or stereo system. The vehicle operator may then select a provider, which causes the opportunity server to confirm the bid and appointment to the winning provider.

When the mobile system arrives at the anticipated location $p_2$ on or about the anticipated time of arrival $t_2$, the service action may be made without unnecessary delays waiting for parts, personnel, or shopping for an acceptable cost or price.

If no provider is selected or no acceptable bid is made in the first search, the opportunity server (17) may repeat the search and offer process for a subsequent location $p_2$ and expected time of arrival $t_2$ which is either part of the operator's desired itinerary or within an acceptable deviation from the desired itinerary.

Figure 2:
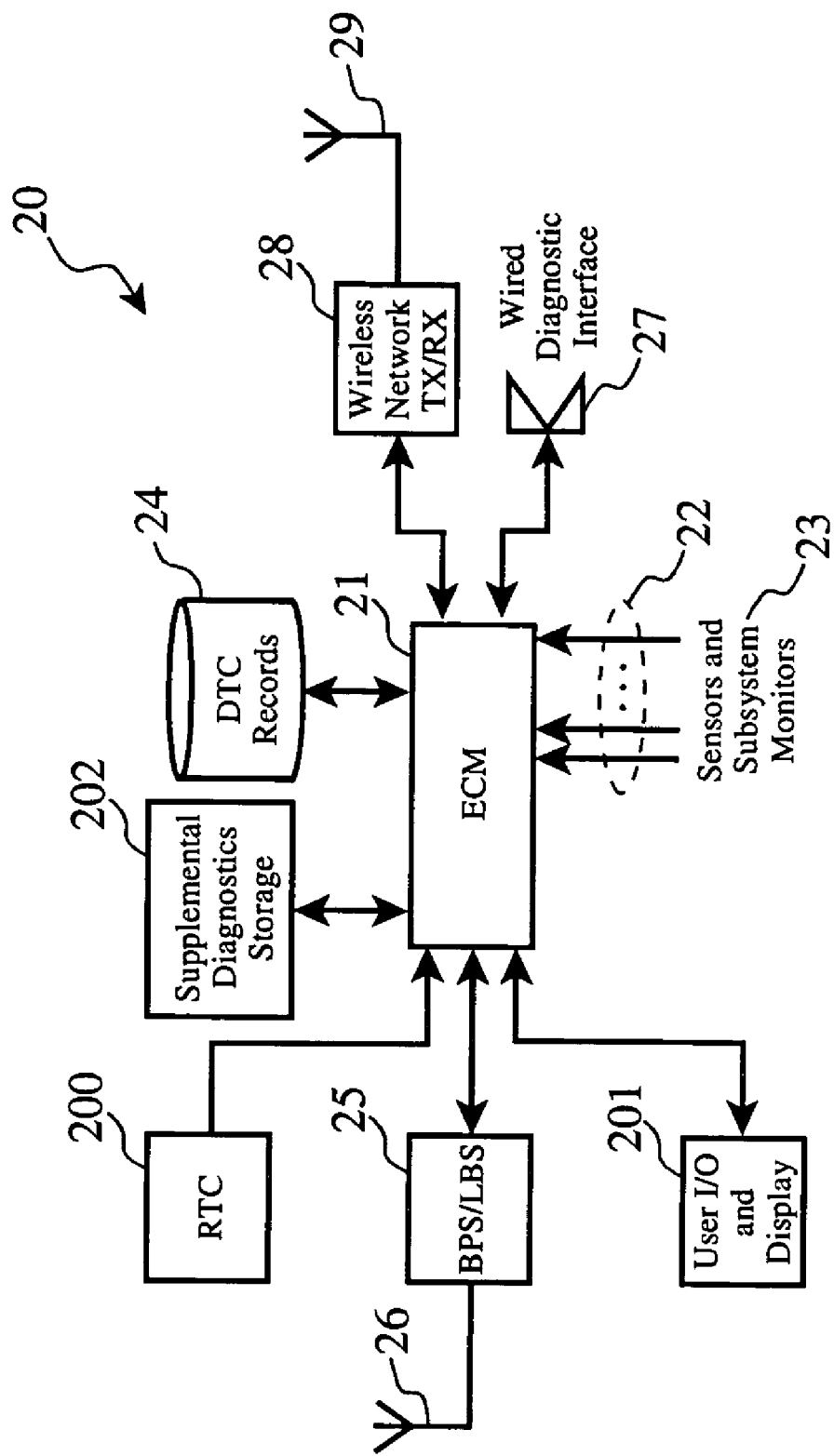
FIG. 2 provides details of an enhanced electronic control module.

Turning to FIG. 2, details of the enhanced ECM (20) of the mobile system according to one available embodiment are shown. The ECM (21), which includes a microprocessor or microcontroller, is interfaced (22) to a plurality of sensors and other subsystem monitors (e.g. controllers in a transmission, fuel injectors, etc.) via a bus such as the aforementioned J1850 or CAN bus, or appropriate proprietary or standard bus according to an alternate embodiment and vehicle application. Through this interface (22), the ECM receives information regarding detected failures, faults and out-of-range conditions, which are recorded in DTCs in the ECM memory (24).

The enhanced ECM (20) is also provided with location means, such as a GPS receiver or LBS-enabled wireless interface (25, 26), as well as a real-time clock (200). The location of the vehicle at the time of the detected event is recorded either with each DTC or in a separate DTC associated with the first DTC. Contact is then initiated through a wireless network interface (28, 29), such as a PCS interface, to the remote opportunity server, and the DTC's are transmitted or uploaded to the server.

The ECM is also provided with storage (202) for the downloaded supplemental diagnostic functions, from which it may execute supplemental diagnostic functions received from provider servers. This may be volatile memory such as random access memory ("RAM"), or may be non-volatile memory, such as FlashROM, battery-backed RAM, or a disk drive.

Using the wireless network interface (28, 29), the enhanced ECM (20) may initially receive downloaded supplemental diagnostics, and to transmit the results of the supplemental diagnostics to the opportunity server or alternatively to the supplemental diagnostics provider server.

Towards the end of the process after supplemental diagnostics have been completed, the wireless network interface (28, 29) is used to receive the coalesced opportunities (e.g. collected and qualified bids or offers from the providers) from the opportunity server, display or present them through the user interface (201), and receive a user selection. Presentation may be through a visual display, such as using an LCD or TFT display, or audibly using text-to-speech or telephone audio channels. The user's selection, such as a speech-recognized "yes" or "no" or input from a touch screen, may be transmitted back to the opportunity server via the wireless interface.

Some of these functions may be provided in combination with each other. For example, GPS operates on transmission of time-based signals from satellites to the GPS receivers, and as such, a GPS receiver includes a real-time clock. Also, a PCS phone which is LBS-enabled can also be employed as the wireless network interface.

Figure 3:
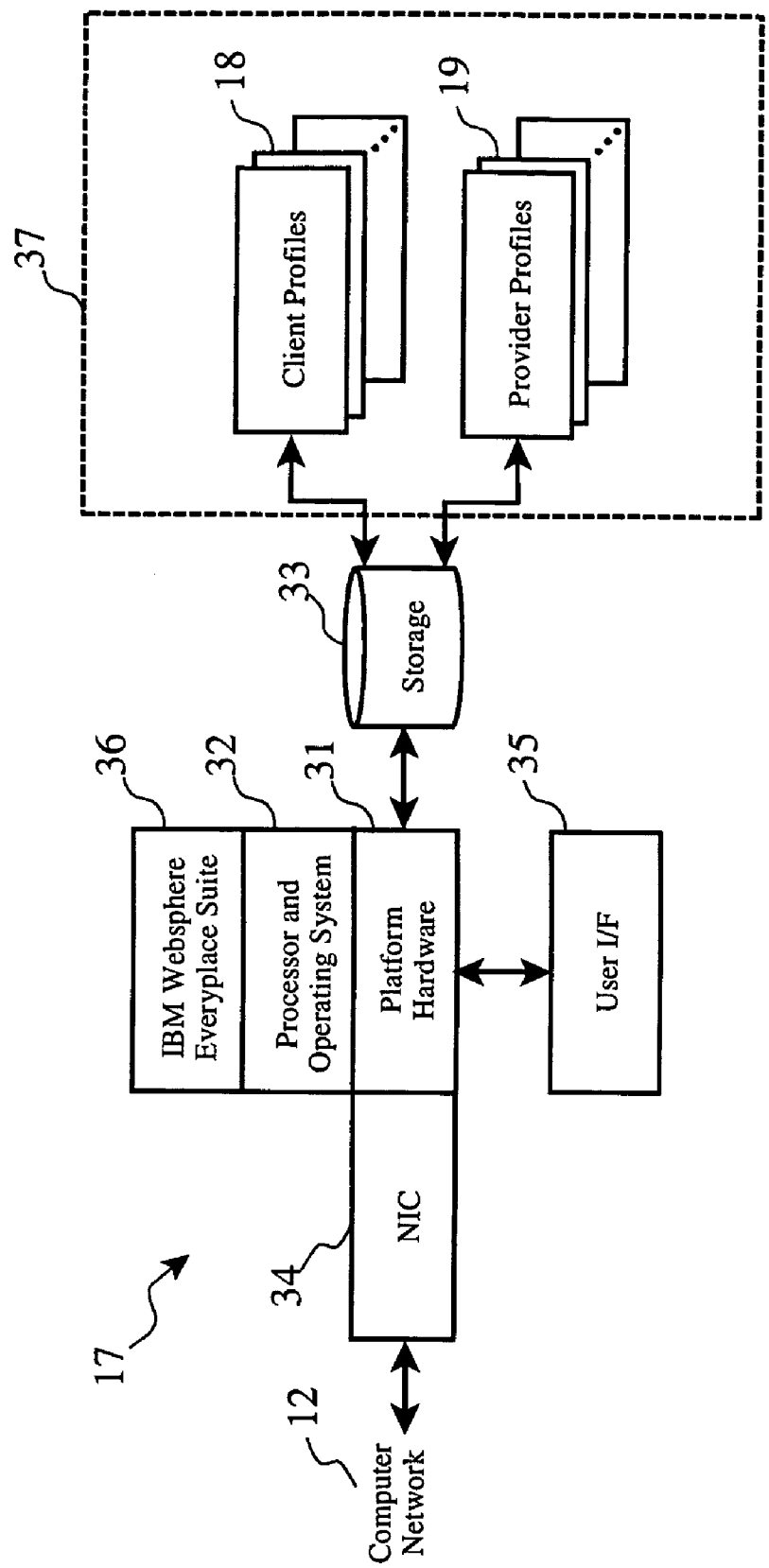
FIG. 3 provides details of the opportunity server and provider server(s).

FIG. 3 provides more details of the opportunity server (17), which includes a common web server computing hardware platform (31) and operating system (32). The computing platform is preferrably an IBM eServer such as the IBM i-Series, or any other suitable computer platform such as an IBM-compatible personal computer, Sun Microsystem's server, or other capable computer. The hardware platform is also preferably equipped with a network interface ("NIC") (34) for communication with the computer network (12) such as the Internet. The NIC (34) may be as simple as a modem, or as sophisticated as a high bandwidth digital subscriber loop ("DSL") or T-1 interface (or better). The hardware platform is also preferably provided with a set of user interface devices (35) such as a display, keyboard and mouse, for administration and configuration activities.

The operating system is preferably IBM's AIX operating system, which is well adapted to web server applications, but may also be any other suitable operating system including but not limited to IBM's OS/2, Sun Microsystem's Solaris, Unix, Linux, or Microsoft's Windows. The opportunity server is also preferably provided with one or more persistent storage devices (33) such as a disk array.

To realize the invention in the opportunity server, a web server suite, preferably IBM's WebSphere Everyplace Suite, is provided with a number of application programs or scripts to implement the logical processes of the invention, as described in the preceding paragraphs and in more detail in the following paragraphs. The WebSphere product is well known in the industry, and methods and tools for implementing custom logical processes for networked business solutions are commonplace as the WebSphere product is widely in use by businesses, financial institutions, and government agencies around the world. Other suitable a capable software programs and/or suites may be utilized in place of the WebSphere product without departing from the spirit and scope of the present invention.

FIG. 3 may also be referenced for realization of a suitable platform for a service provider server, in which the profiles (37) may be eliminated, and the supplemental diagnostic functions may be maintained in the server storage (33). Scripts or programs to provide logic to select appropriate supplemental diagnostics may be provided on the provider server similarly, as well.

Figure 4:
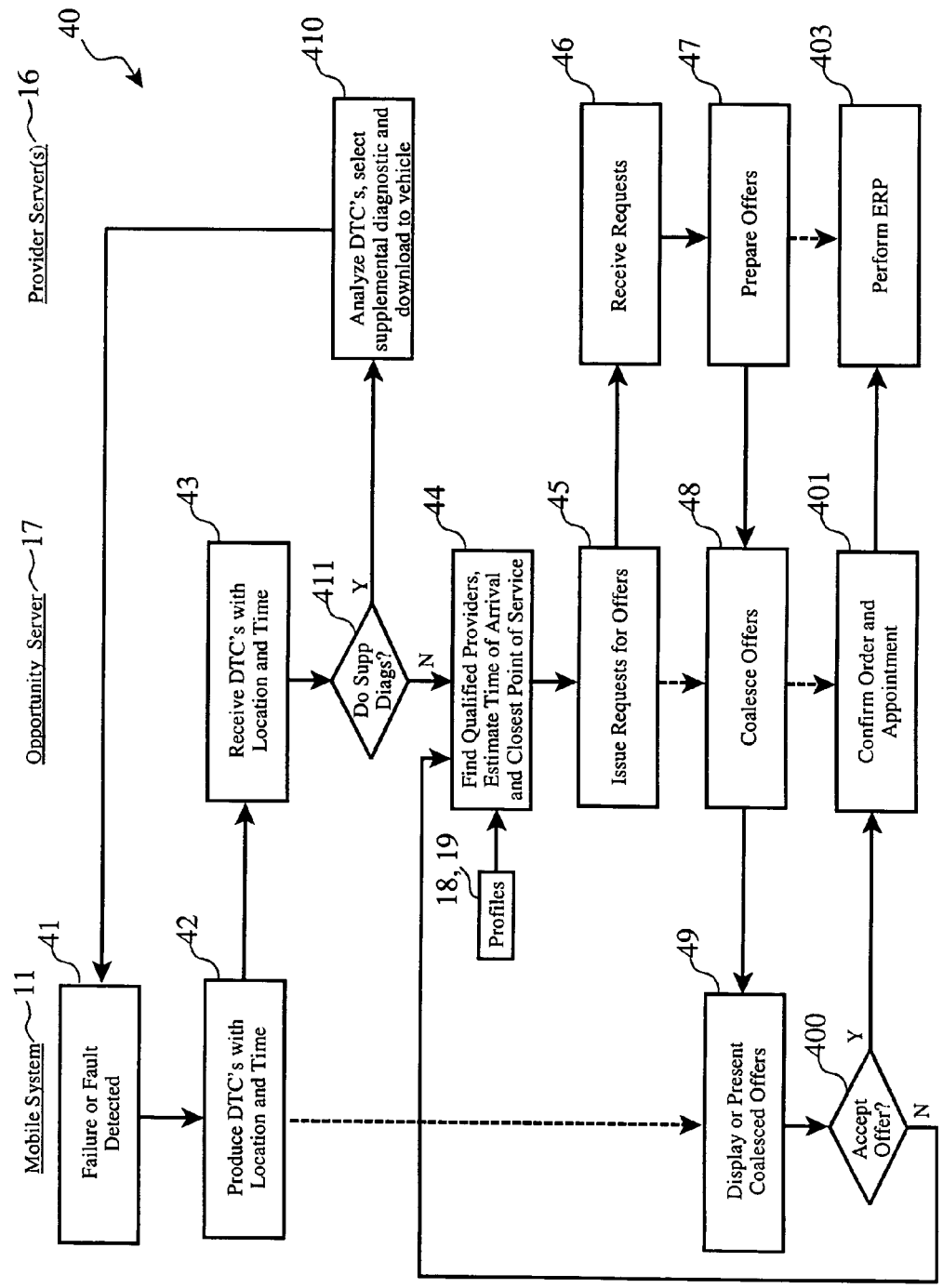
FIG. 4 sets forth the logical process according to the invention.

As such, the logical processes are implemented in part in the mobile system's enhanced ECM (e.g. firmware or software), in part in the customizable logical processes (e.g. Java, scripts, etc.) on the opportunity server, and in part by the provider's servers. These logical processes are shown in FIG. 4 with their cooperative interactions.

When the enhanced ECM detects a fault condition, failure, or out-of-range measurement (41) on the mobile system, it produces (42) one or more DTCs, and transmits those with the mobile system's time and location to the opportunity server, preferably via a wireless network.

The opportunity server then receives (43) the DTC's, and determines if supplemental diagnostics are available for the vehicle (411). If so, then the supplemental diagnostic service provider server (16) is provided with the DTC's. The provider server then analyzes the DTC's, selects one or more supplemental diagnostic functions, and downloads (410) them to the vehicle. The vehicle may execute the supplemental diagnostics and produce new or updated DTC's (42), which are returned to the opportunity server (17). Alternatively, they may be returned to the provider server (16). This cycle (41, 42, 43, 411, 410) of receiving DTC's, analyzing the DTC's, selecting additional diagnostics, and downloading additional and supplemental diagnostics may be performed for several iterations until no additional suitable diagnostic functions are available (e.g. until maximum precision and fault isolation has been achieved).

Upon the conclusion of the supplemental diagnostic phase, the opportunity server proceeds to check the user's profile and the provider profiles (18, 19) which are in the area of the next expected point of service (e.g. next or closest town, port, airport, etc.). Then, the DTC's are processed (45) to create requests for bids for the needed service repair, and are transmitted via the computer network to one or more provider servers.

Each provider servers receive (46) the requests, prepares (47) one or more offers if the provider is able to perform the maintenance service, and transmits these back to the opportunity server.

The opportunity server "coalesces" (e.g. modifies and combines) these offers by first screening them to meet the user's preferences, followed by organizing them into a format which is easily and uniformly presented to the mobile system operator. This may include performing text-to-speech conversion to allow for audible presentation via a telephone channel, adjusting and filtering graphics for presentation on a dashboard display which has limited capabilities, and minimizing text for quicker reading.

The coalesced offers are then transmitted preferably on the wireless network to the enhanced ECM, where they are presented to the mobile system operator (49) through display, audio, or both. The user can then accept an offer (400), such as by making a verbal election or touching an icon on a touchscreen, which results in the selection being transmitted to the opportunity server, which in turn performs a confirmation transaction (400) with the winning provider server. The selected provider server then performs enterprise resource planning functions (403) to order and deliver replacement parts to the point of service, schedule appropriately skilled personnel to be on call at the expected time of arrival, and to reserve an appointment for service.

If the mobile system operator declines all offers (402), then the opportunity server may widen the "bid pool" to include service providers which are located at a subsequent point of service (e.g. two towns away, two ports away, etc.), and/or which do not completely meet the user's preferences. For example, if the user prefers to have his car repaired at dealer-owned shops but no dealers are found, the bid pool is widened to include any qualified shops for the user's make of car.

To annotate FIG. 4 by way of example, suppose a car modified according to the present invention in route from Dallas to Austin, Tex., undergoes a failure in the fuel system. The ECM detects that fuel pressure is abnormally low, but that sensors on the fuel injectors indicate acceptable fuel flow. This causes a first DTC to be created for a low fuel pressure, and a second DTC to be created for a potential root cause of a loose or damaged fuel filler cap (42). Additionally, the location of the vehicle is determined using GPS, and a third time-location DTC is created.

When the opportunity server receives (43) these 3 DTC records, it immediately contacts a supplemental diagnostics provider server, which then selects additional diagnostic functions and downloads them to the vehicle. Following the example scenario previously discussed, these supplemental diagnostics then determine that it is likely a sensor or wiring problem, and not likely a fuel pump or filler cap problem.

Upon receipt of the final, more resolute DTC's, the opportunity server consults the user's profile and finds that he prefers to have his car repaired by the dealers associated with the manufacturer of his vehicle. So, using the location information, a database of providers is searched looking for dealers in the next town where the vehicle will be arriving, perhaps Waco, Tex., and towns which the vehicle has recently passed, perhaps Temple, Tex. This determination of points of service within the vehicle's vicinity can be made several ways. In its simplest form, the user may input the towns on the ECM's user interface, which can be included in the third DTC.

Alternately, two successive GPS measurements can be made, which can be used to calculate vehicle direction and velocity, which can also be included in the DTC and used by the opportunity in conjunction with a digital map to determine upcoming towns on the vehicle's path. An estimated time of arrival can also be either calculated using this information, or provided directly by the vehicle operator.

Once a set of qualified providers has been determined, requests for bids can be transmitted to the provider's servers online, through means such as EDI, email, fax, etc. The providers' servers receive the requests, and in this example, determine if they can have parts (e.g. a fuel cap for the user's make and model of car) and skilled staff on hand at the estimated time of arrival of the vehicle. An offer can be generated, if desired, and transmitted back to the opportunity server, again using e-mail, EDI, fax, etc.

The opportunity server collects all of the returned offers, formats and filters (e.g. "coalesces") them for presentation to the user, and sends them to the vehicle using the wireless network. In our example, let's assume that the quote price from two dealers is too high for the driver to accept, so he rejects (102) all of the offers, which allows the opportunity server to search for dealers in the next farther towns, perhaps Austin, Tex., and Grand Prairie, Tex., as well as for non-dealer service shops in Waco capable of performing the repairs. Requests for bids are produced and transmitted (45), and offers from 2 dealers in Austin and a Pep Boys store in Waco are received, coalesced (48), and presented (49) to the driver.

The driver then may select a lower priced dealer offer in Austin, if available, or a closer offer from Pep Boys if it is less expensive, which then results in the scheduling (403) of the service at the selected provider's facilities.

The invention presented herein meets the objectives and needs not presently met by systems and methods currently available. It allows an operator of a mobile system or vehicle to effectively schedule and negotiate for service actions while in transit, with minimized delay and perturbation to a desired itinerary or schedule, while incurring minimal unexpected expenses. It further allows the on-board or resident diagnostic capabilities of a vehicle to be intelligently supplemented by a server provider, thereby increasing the likelihood of receiving such a service action within the expected resolution time and cost while minimizing the need for on-board program storage of the vehicle control computer.

What is claimed is:

1. A method for providing an enhanced diagnostic service for mobile systems comprising the steps of:
    determining if any downloadable supplemental diagnostic functions are available to isolate a failure according to a service signal from a mobile system;
    downloading one or more available supplemental diagnostic functions to said mobile system for execution;
    coalescing one or more offers for a repair service according to results of said execution of said downloaded functions; and
    presenting said coalesced offers to an operator of said mobile system.

2. The method as set forth in claim 1 further comprising the steps of:
    determining one or more service points in the vicinity of the mobile system, and estimated time(s) of arrival at said service points; and
    issuing one or more requests for bids for said repair service to one or more provider parties in said vicinity; and
    performing enterprise resource planning for said repair service with one of said responding providers.

3. The method as set forth in claim 2 wherein said step of issuing one or more requests for bids comprises consulting one or more user profiles and one or more provider profiles to determine which, if any, provider parties are qualified to receive a request for bid for the indicated repair need.

4. A method for providing enhanced mobile system diagnostics responsive to a service signal from a mobile system indicating the location of the mobile system and a general need for service, the method comprising the steps of:
    analyzing a service signal to determine if any downloadable supplemental diagnostic functions are available to isolate a failure;
    selecting said available supplemental diagnostic function(s); and
    downloading said selected supplemental diagnostic function to said mobile system for execution.

5. The method as set forth in claim 4 further comprising the steps of:
    determining one or more service points in the vicinity of the mobile system, and estimated time(s) of arrival at said service points;
    issuing one or more requests for bids for said repair service to one or more provider parties;
    coalescing one or more offers for said repair service received from said provider parties;
    presenting said coalesced offers to an operator of said mobile system; and
    performing enterprise resource planning for said repair service with one of said responding providers.

6. The method as set forth in claim 5 wherein said step of issuing one or more requests for bids comprises consulting one or more user profiles and one or more provider profiles to determine which, if any, provider parties are qualified to receive a request for bid for the indicated repair need.

7. The method as set forth in claim 5 further comprising repeating said steps of receiving a signal from a mobile vehicle, selecting and downloading supplemental diagnostic functions.

8. A computer readable medium encoded with software for providing enhanced mobile system diagnostics responsive to a service signal from a mobile system indicating the location of the mobile system and a general need for service, said software performing the steps of:
    analyzing a service signal to determine if any downloadable supplemental diagnostic functions are available to isolate a failure;
    selecting said available supplemental diagnostic function(s); and
    downloading said selected supplemental diagnostic function to said mobile system for execution.

9. The computer readable medium as set forth in claim 8 further comprising software for performing the steps of:
    determining one or more service points in the vicinity of the mobile system, and estimated time(s) of arrival at said service points;
    issuing one or more requests for bids for said repair service to one or more provider parties;

coalescing one or more offers for said repair service received from said provider parties;

presenting said coalesced offers to an operator of said mobile system; and performing enterprise resource planning for said repair service with one of said responding providers.

10. The computer readable medium as set forth in claim 9 wherein said software for issuing one or more requests for bids comprises software for consulting one or more user profiles and one or more provider profiles to determine which, if any, provider parties are qualified to receive a request for bid for the indicated repair need.

11. The computer readable medium as set forth in claim 9 further comprising software for repeating said steps of receiving a signal from a mobile vehicle, selecting and downloading supplemental diagnostic functions.

12. A system for arranging for diagnosing failures and faults of a mobile system while said mobile system is in transit, said system comprising:

an opportunity server communicably disposed between said mobile system and one or more provider servers;

a repair service need message receptor cooperative with said opportunity server for receiving one or more trouble codes from a mobile system;

a diagnostic request generator disposed within said opportunity server for forwarding one or more trouble codes to one or more provider servers; and one or more provider servers configured to receive said trouble codes from said request generator, and having a repository of supplemental diagnostic software functions, a selector for selecting a function from said repository, and a supplemental diagnostic function transmitter for downloading one or more selected diagnostic functions to said mobile system.

13. The system as set forth in claim 12 wherein said opportunity server further comprises:

a diagnostic system on board said mobile system having a location resolver, said diagnostic system having a wireless networking interface for transmitting repair service need messages and receiving executable software;

a bid request generator/transmitter, an offer receptor, an offer coalescer/transmitter, a user selection receptor, and an order confirmer such that needs for service by said mobile system may be brokered on behalf of an operator of said vehicle, and may be scheduled for future consumption by said operator according to an accepted offer.

14. The system as set forth in claim 13 wherein said diagnostic system comprises a global positioning system.

15. The system as set forth in claim 13 wherein said diagnostic system comprises a location based services system.

16. The system as set forth in claim 13 wherein said diagnostic system comprises a vehicle electronic control module.

17. The system as set forth in claim 12 wherein said provider servers comprise networked enterprise servers for querying for service action quotes and offers over the Internet.

18. The system as set forth in claim 12 wherein said opportunity server further comprises a set of user profiles and a set of provider profiles, and a profile analyzer for selecting one or more providers to receive requests for bids according to provider profiles matching preferences specified in said user profiles, and conditions of said mobile system selected from the group of location of the mobile system, direction and speed of travel of the mobile system, and make-and-model of the mobile system.

* * * * *